US007958021B2

(12) United States Patent
Schoonmaker et al.

(10) Patent No.: US 7,958,021 B2
(45) Date of Patent: Jun. 7, 2011

(54) METHOD AND DEVICE FOR COLLECTING AND REPORTING DATA

(75) Inventors: Rena M. Schoonmaker, Las Vegas, NV (US); Robert P. Bartholomew, Corvallis, OR (US); Richard J. Schneider, Las Vegas, NV (US)

(73) Assignee: IGT, Reno, NV (US)

( * ) Notice: Subject to any disclaimer, the term of this patent is extended or adjusted under 35 U.S.C. 154(b) by 871 days.

(21) Appl. No.: 10/660,343

(22) Filed: Sep. 10, 2003

(65) Prior Publication Data

US 2004/0133485 A1    Jul. 8, 2004

Related U.S. Application Data

(60) Provisional application No. 60/409,779, filed on Sep. 10, 2002.

(51) Int. Cl.
*G07F 19/00* (2006.01)
(52) U.S. Cl. .......................................................... 705/30
(58) Field of Classification Search ...................... 705/30
See application file for complete search history.

(56) References Cited

U.S. PATENT DOCUMENTS

| | | | | |
|---|---|---|---|---|
| 5,470,079 | A * | 11/1995 | LeStrange et al. | 463/25 |
| 5,759,103 | A * | 6/1998 | Freels et al. | 463/42 |
| 2001/0055990 | A1 | 12/2001 | Acres | |
| 2002/0152120 | A1* | 10/2002 | Howington | 705/14 |
| 2002/0183105 | A1* | 12/2002 | Cannon et al. | 463/16 |
| 2002/0187834 | A1* | 12/2002 | Rowe et al. | 463/42 |
| 2003/0069071 | A1* | 4/2003 | Britt et al. | 463/42 |

FOREIGN PATENT DOCUMENTS

| | | |
|---|---|---|
| EP | 0688003 | 12/1995 |
| EP | 1231577 | 8/2002 |
| WO | WO02055163 | 7/2002 |
| WO | WO2004025591 | 3/2004 |

OTHER PUBLICATIONS

PR Newswire, "Innovative Gaming Announces Market Leading 8-Month Performance Results of 174% Over Casino Average," Nov. 27, 2000, p. 4932.*
Great Britain Examination Report dated Jun. 14, 2005, related to corresponding U.S. Appl. No. 10/660,343.
International Search Report dated May 18, 2004 issued in WO2004/025591.
Australian Examination Report dated Nov. 12, 2008, from corresponding Application No. 2003266024.
Australian Examination Report dated Dec. 3, 2009 issued in Application No. 2003266024.

\* cited by examiner

*Primary Examiner* — John W Hayes
*Assistant Examiner* — Nathan Erb
(74) *Attorney, Agent, or Firm* — Weaver Austin Villeneuve & Sampson LLP

(57) ABSTRACT

Embodiments of the invention are directed to a slot machine data collection and reporting system capable of operating with multi-denomination, multi-game machines. These machines allow the patron to select the denomination of the wager unit, the game type, and the exact game pay schedule to be played. Each possible combination of denomination, game type, and game pay schedule may result in a unique theoretical hold percentage. Each combination may also have differing levels of player acceptance. The described system allows for the computation and tracking of handle, game hold percentage, theoretical hold percentage, and net win for each of the possible combinations within a single slot machine cabinet, and for all the games coupled to a gaming network.

24 Claims, 25 Drawing Sheets

FIG.2 MULTI DENOM MULTI GAME CONFIGURATION

Maintenance Console

- System Maintenance
  - Paytables
  - Denoms
  - Denom Groups
  - Paytable Groups
  - Configuration Setu
  - Machine Type Set

| Description | Game ID | Paytable ID | Additional ID |
|---|---|---|---|
| 4 Card Keno | WC | 90P | 1 |
| Black Jack | WC | BJ5 | 2 |
| Bonus Poker | WC | P1003A | 4 |
| Dbl Bonus Poker | WC | P1036A | 7 |
| Dbl Dbl Bonus Poker | WC | P1011A | 11 |
| Dbl Dbl Dbl Bonus Poker | WC | P1012A | 5 |
| Double Bucks | WC | 000088 | 9 |
| Deuces Wild | WC | P1030A | 6 |
| Joker Poker | WC | P1049D | 8 |
| Triple Bonus Poker + | WC | P1063A | 10 |

[Add...]  [Modify...]  [Delete]  [Done]

FIG.4

| Maintenance Console | | |
|---|---|---|
| ⊟--☐ System Maintenance | Denom | Description |
| ⌐♤ Paytables | $ 0.01 | One Cents |
| ├[$ Denoms] | $ 0.02 | Two Cents |
| ├⚒ Denom Groups | $ 0.05 | Five Cents |
| ├✤ Paytable Groups | $ 0.10 | Ten Cents |
| ├⚙ Configuration Setu | $ 0.25 | Twenty Five Cents |
| └● Machine Type Set | $ 0.50 | Fifty Cents |
| | $ 1.00 | One Dollar |
| | $ 2.00 | Two Dollars |
| | $ 5.00 | Five dollars |
| | $ 10.00 | Ten Dollars |
| | $ 25.00 | Twenty Five Dollars |
| | $ 50.00 | Fifty Dollars |
| | $ 100... | One Hundred Dollars |

Add... | Modify... | Delete | Done

FIG.9

| MDMG Machine Type Setup | | |
|---|---|---|
| ⊙ Show All  ○ MDMG | | Done |
| MFR | Description | Add New |
| ACRES | MANUAL MACHINE | Update |
| ACRES | TEST 333 | |
| WILLIAMS | NEWGAME | |
| ACRES | COMMONTEST | |
| SILICONE | ODYSSEY | |
| ANCHOR | LION FISH | |
| ACRES | TEST | |
| ACRES | TEST 10012A | |
| ANCHOR | FIVE TIMES PLAY | |
| SIGMA | SMOKIN BONUS 7 | |
| SIGMA | SMOKIN BONUS 3 | |
| ARISTOCRAT | WILD COUGER | |
| ANCHOR | LION FISH | |

FIG.16

Your Casino & Hotel
Multi Denom Multi Game Slot Master
Period from <<Start Date & Time>> to <<End Date & Time>>

| Type | Machine | Location | Config ID | Wager Denom | Desc | Eprom | PayTable ID | Addl ID | Theo Hold % |
|---|---|---|---|---|---|---|---|---|---|
| Poker | 20003 | A0101 | 1 | $0.25 | Dbl Dbl | 0125 | 1 | | 3.50 |
| | 20003 | A0101 | 1 | $0.50 | Dbl Dbl | 0125 | 2 | | 6.00 |
| | 20003 | A0101 | 1 | $1.00 | Dbl Dbl | 0125 | 3 | | 4.00 |
| Config Subtotal: | | | 3 | | | | | | |
| Poker | 30001 | C0101 | 2 | $1.00 | Deuces Wild | 0127 | 1 | | 5.00 |
| | 30001 | C0101 | 2 | $5.00 | Deuces Wild | 0127 | 2 | | 12.50 |
| Config Subtotal: | | | 2 | | | | | | |
| Poker | 50001 | B0101 | 4 | $5.00 | Dbl Diamond | 0186 | 1 | | 12.50 |
| | 50001 | B0101 | 4 | $10.00 | Dbl Diamond | 0186 | 2 | | 4.00 |
| | 50001 | B0101 | 4 | $25.00 | Dbl Diamond | 0186 | 3 | | 6.75 |
| Config Subtotal: | | | 3 | | | | | | |
| | 50002 | B0102 | 5 | $5.00 | Draw Poker | 0127 | 3 | 1 | 12.50 |
| Config Subtotal: | | | 1 | | | | | | |
| Type Subtotal: | | | 9 | | | | | | |
| Reel | 20004 | A0102 | 3 | $0.25 | Red Wht Blue | 0126 | 1 | | 12.00 |
| | 20004 | A0102 | 3 | $0.50 | Red Wht Blue | 0126 | 2 | | 12.00 |
| | 20004 | A0102 | 3 | $1.00 | Red Wht Blue | 0126 | 3 | | 8.50 |
| Config Subtotal: | | | 3 | | | | | | |
| Type Subtotal: | | | 3 | | | | | | |
| Grand Total: | | | 12 | | | | | | |

FIG.19A

Filters - Date, Type, Machine

Sort by Type, Config ID, Desc, Denom; Group by Type; Sub-Total and Grand Total by Type Display only MDMG enabled machines. Report should not show single denom, single game machines.

Formulas:

| | |
|---|---|
| Type | Game Type ? |
| Machine | Machine number |
| Location | Machine location |
| Config ID | Config ID ( new Field) |
| Wager Denom | Wager Denom for machine from MultiGame table |
| Description | Sub - Game Description |
| Eprom | Game Eprom (DevEprom) |
| Paytable ID | Paytable ID |
| Addl ID | Addl ID |
| Theo Hold % | DPC Theoretical Hold = DPC Win/DPC Handle * 100 |
| | DPC Handle = (Starting Coin In - Ending Coin In) |
| | DPC Win = DPC Handle - (Starting Coin Out - Ending Coin Out) |

FIG.19B

Your Casino & Hotel
Multi Denom Multi Game Model Analysis
Period from <<Start Date & Time>> to <<End Date & Time>>

| Config ID | Game Desc | Wager Denom | MFR | Eprom | PayTable ID | Addl ID | Days | Coin In Per Day | Theo Win Per Day | Game Win Per Day | Theo % Per Day | Game % Per Day | Var |
|---|---|---|---|---|---|---|---|---|---|---|---|---|---|
| 1 | Dbl Dbl | $0.25 | IGT | 0125 | 1 | | 30 | 7,500.00 | 262.50 | 250.00 | 3.50 | 3.33 | 0.17 |
| 1 | Dbl Dbl | $0.50 | IGT | 0125 | 2 | | 30 | 1,500.00 | 90.00 | 100.00 | 6.00 | 6.67 | -0.67 |
| 1 | Dbl Dbl | $1.00 | IGT | 0125 | 3 | | 30 | 6,000.00 | 240.00 | 300.00 | 4.00 | 5.00 | -1.00 |
| Config Subtotal: | | 3 | | | | | 30 | 5,000.00 | 197.50 | 216.67 | 4.50 | 4.33 | 0.17 |
| 2 | Deuces Wild | $1.00 | IGT | 0127 | 1 | | 29 | 5,500.00 | 275.00 | 250.00 | 5.00 | 4.55 | 0.45 |
| 2 | Deuces Wild | $5.00 | IGT | 0127 | 2 | | 29 | 800.00 | 100.00 | 100.00 | 12.50 | 12.50 | 0.00 |
| Config Subtotal: | | 2 | | | | | 29 | 3,150.00 | 187.50 | 175.00 | 8.75 | 5.56 | 3.19 |
| 3 | Red Wht Blue | $0.25 | IGT | 0126 | 1 | | 30 | 900.00 | 108.00 | 130.00 | 12.00 | 14.44 | -2.44 |
| 3 | Red Wht Blue | $0.50 | IGT | 0126 | 2 | | 30 | 1,700.00 | 204.00 | 200.00 | 12.00 | 11.76 | 0.24 |
| 3 | Red Wht Blue | $1.00 | IGT | 0126 | 3 | | 30 | 2,500.00 | 212.50 | 220.00 | 8.50 | 8.80 | -0.30 |
| Config Subtotal: | | 3 | | | | | 30 | 1,700.00 | 174.83 | 183.33 | 10.83 | 10.78 | 0.05 |
| 4 | Dbl Diamond | $5.00 | IGT | 0186 | 1 | | 30 | 800.00 | 100.00 | 100.00 | 12.50 | 12.50 | 0.00 |
| 4 | Dbl Diamond | $10.00 | IGT | 0186 | 2 | | 30 | 10,000.00 | 400.00 | 400.00 | 4.00 | 4.00 | 0.00 |
| 4 | Dbl Diamond | $25.00 | IGT | 0186 | 3 | | 30 | 1,500.00 | 101.25 | 100.00 | 6.75 | 6.67 | 0.08 |
| Config Subtotal: | | 3 | | | | | 30 | 4,100.00 | 200.42 | 200.00 | 7.75 | 4.88 | 2.87 |
| 5 | Draw Poker | $5.00 | IGT | 0127 | 3 | 1 | 29 | 800.00 | 100.00 | 100.00 | 12.50 | 12.50 | 0.00 |
| Config Subtotal: | | 1 | | | | | 29 | 800.00 | 100.00 | 100.00 | 12.50 | 12.50 | 0.00 |
| Grand Total: | | 12 | | | | | 30 | 3,487.50 | 190.06 | 193.75 | 7.96 | 5.56 | |

\* Check VAR unsigned.

FIG.20A

Display only MDMG enabled machines. Report should not show single denom, single game machines.

Formulas:

Config ID         Config ID ( new Field)
Description       Sub - Game Description (i.e. DBL DBL, Deuces Wild, Red Wht Blue)
Wager Denom       Denomination of the unit of wagering
Eprom             Game Eprom (DevEprom)
Paytable ID       Paytable ID
Addl ID           Additional Paytable ID, if available for specified model
Days              Days on floor for date range of report
Coin In Per Day   DPC Handle = (Starting Coin In - Ending Coin In) for days on floor for the date range run
Theo Win Per Day  (Theo Hold Percentage * (Starting Coin In - Ending Coin In))*100
Game Win Per Day  DPC Win = ((Starting Coin In - Ending Coin In) - (Starting Coin Out - Ending Coin Out)) for days on floor for the date range run
Theo Hold % Per Day   Theo Hold Percentage for the days on floor for the date range run
Game Hold % Per Day   (DPC Win/DPC Handle)*100 for days on floor for the date range run Where   DPC Handle = (Starting Coin In - Ending Coin In) for days on floor for the date range run
            and     DPC Win = DPC Handle - (Starting Coin Out - Ending Coin Out) for days on floor for the date range run VAR         Theo Hold % Per Day - Game Hold % Per Day

FIG.20B

Your Casino & Hotel
Multi Denom Multi Game Machine Analysis
Period from <<Start Date & Time>> to <<End Date & Time>>

| | | Config | | Wager | | | | Pay Table ID | Add ID | | Coin In | Theo Win | Game Win | Theo % Per | Game % Per | |
|---|---|---|---|---|---|---|---|---|---|---|---|---|---|---|---|---|
| Mach | Loc | ID | Game Desc | Denom | MFR | Eprom | | | | Days | Per Day | Per Day | Per Day | Day | Day | Var |
| 20003 | A0101 | 1 | Dbl Dbl | $0.25 | IGT | 0125 | | 1 | | 30 | 7,500.00 | 262.50 | 250.00 | 3.50 | 3.33 | 0.17 |
| 20003 | A0101 | 1 | Dbl Dbl | $0.50 | IGT | 0125 | | 2 | | 30 | 1,500.00 | 90.00 | 100.00 | 6.00 | 6.67 | ## |
| 20003 | A0101 | 1 | Dbl Dbl | $1.00 | IGT | 0125 | | 3 | | 30 | #### | 240.00 | 300.00 | 4.00 | 5.00 | ## |
| Machine Subtotal: | | 3 | | | | | | | | 30 | #### | 197.50 | 216.67 | 4.50 | 4.33 | |
| 20004 | A0102 | 3 | Red Wht Blue | $0.25 | IGT | 0126 | | 1 | | 30 | 900.00 | 108.00 | 130.00 | 12.00 | 14.44 | ## |
| 20004 | A0102 | 3 | Red Wht Blue | $0.50 | IGT | 0126 | | 2 | | 30 | 1,700.00 | 204.00 | 200.00 | 12.00 | 11.76 | 0.24 |
| 20004 | A0102 | 3 | Red Wht Blue | $1.00 | IGT | 0126 | | 3 | | 30 | #### | 212.50 | 220.00 | 8.5 0 | 8.80 | ## |
| Machine Subtotal: | | 3 | | | | | | | | 30 | #### | 174.83 | 183.33 | 10.83 | 10.78 | |
| 30001 | C0101 | 2 | Deuces Wild | $1.00 | IGT | 0127 | | 1 | | 29 | 5,500.00 | 275.00 | 250.00 | 5.00 | 4.55 | 0.45 |
| 30001 | C0101 | 2 | Deuces Wild | $5.00 | IGT | 0127 | | 2 | | 29 | 800.00 | 100.00 | 100.00 | 12.50 | 12.50 | 0.00 |
| Machine Subtotal: | | 2 | | | | | | | | 29 | #### | 187.50 | 175.00 | 8.75 | 5.56 | |
| 50001 | B0101 | 4 | Dbl Diamond | $5.00 | IGT | 0186 | | 1 | | 30 | 800.00 | 100.00 | 100.00 | 12.50 | 12.50 | 0.00 |
| 50001 | B0101 | 4 | Dbl Diamond | $10.00 | IGT | 0186 | | 2 | | 30 | #### | 400.00 | 400.00 | 4.00 | 4.00 | 0.00 |
| 50001 | B0101 | 4 | Dbl Diamond | #### | IGT | 0186 | | 3 | | 30 | 1,500.00 | 101.25 | 100.00 | 6.75 | 6.67 | 0.08 |
| Machine Subtotal: | | 3 | | | | | | | | 30 | #### | 200.42 | 200.00 | 7.75 | 4.88 | |
| 50002 | B0102 | 5 | Draw Poker | $5.00 | IGT | 0127 | | 3 | 1 | 29 | 800.00 | 100.00 | 100.00 | 12.50 | 12.50 | 0.00 |
| Machine Subtotal: | | 1 | | | | | | | | 29 | #### | 100.00 | 100.00 | 12.50 | 12.50 | ## |
| | | | | | | | | | | | | | | | *Check VAR unsigned. | |
| Grand Total: | | 2 | | | | | | | | 30 | #### | 172.05 | 175.00 | 8.87 | 5.93 | |

FIG.21A

Filter on Machine;Group by Machine
Sort by Mach, Loc, Config ID
Display only MDMG enabled machines. Report should not show single denom, single game machines.

Formulas:

| Field | Description |
|---|---|
| Mach | Machine |
| Loc | Location |
| Config ID | Config ID ( new Field) |
| Description | Sub - Game Description (i.e. DBL DBL, Deuces Wild, Red Wht Blue) |
| Wager Denom | Denomination of the unit of wagering |
| Eprom | Game Eprom (DevEprom) |
| Paytable ID | Paytable ID |
| Addl ID | Additional Paytable ID, if available for specified model |
| Days | Days on floor for date range of report |
| Coin In Per Day | DPC Handle = (Starting Coin In - Ending Coin In) for days on floor for the date range run |
| Theo Win Per Day | (Theo Hold Percentage * (Starting Coin In - Ending Coin In))*100 |
| Game Win Per Day | DPC Win = ((Starting Coin In - Ending Coin In) - (Starting Coin Out - Ending Coin Out)) for days on floor for the date range run |
| Theo Hold % Per Day | Theo Hold Percentage for the days on floor for the date range run |
| Game Hold % Per Day | (DPC Win/DPC Handle)*100 for days on floor for the date range run |
| | Where DPC Handle = (Starting Coin In - Ending Coin In) for days on floor for the date range run |
| | and DPC Win = DPC Handle - (Starting Coin Out - Ending Coin Out) for days on floor for the date range run |
| VAR | Theo Hold % Per Day - Game Hold % Per Day |

FIG.21B

Your Casino & Hotel

Multi Denom Multi Game Wager Denom Analysis

Period from <<Start Date & Time>> to <<End Date & Time>>

| Wager | | Config | | | | | | Addl | Day | Coin In | Theo Win | Game Win | Theo % | Game % | Var |
|---|---|---|---|---|---|---|---|---|---|---|---|---|---|---|---|
| Denom | Mach | Loc | ID | Game Desc | MFR | Eprom | PayTable ID | ID | s | Per Day | Per Day | Per Day | Per Day | Per Day | Per Day |
| $0.25 | 20003 | A0101 | 1 | Dbl Dbl | IGT | 0125 | 1 | | 30 | 7,500.00 | 262.50 | 250.00 | 3.50 | 3.33 | 0.17 |
| $0.25 | 20004 | A0102 | 3 | Red Wht Blue | IGT | 0126 | 1 | | 30 | 900.00 | 108.00 | 130.00 | 12.00 | 14.44 | -2.44 |
| Wager Denom Subtotal: | | | 2 | | | | | | 30 | 4,200.00 | 185.25 | 190.00 | 7.75 | 4.52 | 3.23 |
| $0.50 | 20003 | A0101 | 1 | Dbl Dbl | IGT | 0125 | 2 | | 30 | 1,500.00 | 90.00 | 100.00 | 6.00 | 6.67 | -0.67 |
| $0.50 | 20004 | A0102 | 3 | Red Wht Blue | IGT | 0126 | 2 | | 30 | 1,700.00 | 204.00 | 200.00 | 12.00 | 11.76 | 0.24 |
| Wager Denom Subtotal: | | | 2 | | | | | | 30 | 1,600.00 | 147.00 | 150.00 | 9.00 | 9.38 | -0.38 |
| $1.00 | 20003 | A0101 | 1 | Dbl Dbl | IGT | 0125 | 3 | | 30 | 6,000.00 | 240.00 | 300.00 | 4.00 | 5.00 | -1.00 |
| $1.00 | 30001 | C0101 | 2 | Deuces Wild | IGT | 0127 | 1 | | 29 | 5,500.00 | 275.00 | 250.00 | 5.00 | 4.55 | 0.45 |
| $1.00 | 20004 | A0102 | 3 | Red Wht Blue | IGT | 0126 | 3 | | 30 | 2,500.00 | 212.50 | 220.00 | 8.50 | 8.80 | -0.30 |
| Wager Denom Subtotal: | | | 3 | | | | | | 30 | 4,666.67 | 242.50 | 256.67 | 5.83 | 5.50 | 0.33 |
| $5.00 | 30001 | C0101 | 2 | Deuces Wild | IGT | 0127 | 2 | | 29 | 800.00 | 100.00 | 100.00 | 12.50 | 12.50 | 0.00 |
| $5.00 | 50002 | B0101 | 5 | Draw Poker | IGT | 0127 | 3 | 1 | 29 | 800.00 | 100.00 | 100.00 | 12.50 | 12.50 | 0.00 |
| $5.00 | 50001 | B0101 | 4 | Dbl Diamond | IGT | 0186 | 1 | | 30 | 800.00 | 100.00 | 100.00 | 12.50 | 12.50 | 0.00 |
| Wager Denom Subtotal: | | | 3 | | | | | | 29 | 800.00 | 100.00 | 100.00 | 12.50 | 12.50 | 0.00 |
| $10.00 | 50001 | B0101 | 4 | Dbl Diamond | IGT | 0186 | 2 | | 30 | 10,000.00 | 400.00 | 400.00 | 4.00 | 4.00 | 0.00 |
| Wager Denom Subtotal: | | | 1 | | | | | | 30 | 10,000.00 | 400.00 | 400.00 | 4.00 | 4.00 | 0.00 |
| $25.00 | 50001 | B0101 | 4 | Dbl Diamond | IGT | 0186 | 3 | | 30 | 1,500.00 | 101.25 | 100.00 | 6.75 | 6.67 | 0.08 |
| Wager Denom Subtotal: | | | 1 | | | | | | 30 | 1,500.00 | 101.25 | 100.00 | 6.75 | 6.67 | 0.08 |
| Grand Total: | | | 2 | | | | | | 30 | 3,794.44 | 196.00 | 199.44 | 7.64 | 5.26 | |

* Check VAR unsigned.

FIG.22A

Filter on Machine;Group by Machine
Sort by Mach, Loc, Config ID
Display only MDMG enabled machines. Report should not show single denom, single game machines.

Formulas:

| | |
|---|---|
| Wager Denom | Denomination of the unit of wagering |
| Mach | Machine Number |
| Loc | Location |
| Config ID | Config ID ( new Field) |
| Description | Sub - Game Description (i.e. DBL DBL, Deuces Wild, Red Wht Blue) |
| Eprom | Game Eprom (DevEprom) |
| Paytable ID | Paytable ID |
| Addl ID | Additional Paytable ID, if available for specified model |
| Days | Days on floor for date range of report |
| Coin In Per Day | DPC Handle = (Starting Coin In - Ending Coin In) for days on floor for the date range run |
| Theo Win Per Day | (Theo Hold Percentage * (Starting Coin In - Ending Coin In))*100 |
| Game Win Per Day | DPC Win = ((Starting Coin In - Ending Coin In) - (Starting Coin Out - Ending Coin Out)) for days on floor for the date range run |
| Theo Hold % Per Day | Theo Hold Percentage for the days on floor for the date range run |
| Game Hold % Per Day | (DPC Win/DPC Handle)*100 for days on floor for the date range run |
| | Where DPC Handle = (Starting Coin In - Ending Coin In) for days on floor for the date range run |
| | and DPC Win = DPC Handle - (Starting Coin Out - Ending Coin Out) for days on floor for the date range run |
| VAR | Theo Hold % Per Day - Game Hold % Per Day |

FIG.22B

Your Casino & Hotel
Multi Denom Multi Game Machine Detail
Period from <<Start Date & Time>> to <<End Date & Time>>

|  |  | Config | Wager |  |  | Addl |  |  |  |  |  |
|---|---|---|---|---|---|---|---|---|---|---|---|
| Mach | Loc | ID | Denom | Game Desc | PayTable ID | ID | Coin In | HP Out | CoinOut | Theo % | Game % | Var |
| 20003 | A0101 | 1 | $0.25 | Dbl Dbl | 1 |  | 7,500.00 | 0.00 | 7,250.00 | 3.50 | 3.33 | 0.17 |
| 20003 | A0101 | 1 | $0.50 | Dbl Dbl | 2 |  | 1,500.00 | 0.00 | 1,400.00 | 6.00 | 6.67 | -0.67 |
| 20003 | A0101 | 1 | $1.00 | Dbl Dbl | 3 |  | 6,000.00 | 0.00 | 5,700.00 | 4.00 | 5.00 | -1.00 |
| Machine Subtotal: | | 3 | | | | | 15,000.00 | 0.00 | 14,350.00 | 3.95 | 4.33 | -0.38 |
| 20004 | A0102 | 3 | $0.25 | Red Wht Blue | 1 |  | 900.00 | 0.00 | 770.00 | 12.00 | 14.44 | -2.44 |
| 20004 | A0102 | 3 | $0.50 | Red Wht Blue | 2 |  | 1,700.00 | 0.00 | 1,500.00 | 12.00 | 11.76 | 0.24 |
| 20004 | A0102 | 3 | $1.00 | Red Wht Blue | 3 |  | 2,500.00 | 0.00 | 2,280.00 | 8.50 | 8.80 | -0.30 |
| Machine Subtotal: | | 3 | | | | | 5,100.00 | 0.00 | 4,550.00 | 10.28 | 10.78 | -0.50 |
| 30001 | C0101 | 2 | $1.00 | Deuces Wild | 1 |  | 5,500.00 | 0.00 | 5,250.00 | 5.00 | 4.55 | 0.45 |
| 30001 | C0101 | 2 | $5.00 | Deuces Wild | 2 |  | 800.00 | 0.00 | 700.00 | 12.50 | 12.50 | 0.00 |
| Machine Subtotal: | | 2 | | | | | 6,300.00 | 0.00 | 5,950.00 | 5.95 | 5.56 | 0.40 |
| 50001 | B0101 | 4 | $5.00 | Dbl Diamond | 1 |  | 800.00 | 0.00 | 700.00 | 12.50 | 12.50 | 0.00 |
| 50001 | B0101 | 4 | $10.00 | Dbl Diamond | 2 |  | 10,000.00 | 0.00 | 9,600.00 | 4.00 | 4.00 | 0.00 |
| 50001 | B0101 | 4 | $25.00 | Dbl Diamond | 3 |  | 1,500.00 | 0.00 | 1,400.00 | 6.75 | 6.67 | 0.08 |
| Machine Subtotal: | | 3 | | | | | 12,300.00 | 0.00 | 11,700.00 | 4.89 | 4.88 | 0.01 |
| 50002 | B0102 | 5 | $5.00 | Draw Poker | 3 | 1 | 800.00 | 0.00 | 700.00 | 12.50 | 12.50 | 0.00 |
| Machine Subtotal: | | 1 | | | | | 800.00 | 0.00 | 700.00 | 12.50 | 12.50 | 0.00 |
| Grand Total: | | 12 | | | | | 39,500.00 | 0.00 | 37,250.00 | | 12.50 | 0.00 |

* Check VAR unsigned.

FIG.23A

Filter on Machine;Group by Machine

Sort by Mach, Loc, Config ID

Display only MDMG enabled machines. Report should not show single denom, single game machines.

Formulas:

| | |
|---|---|
| Mach | Machine |
| Loc | Location |
| Config ID | Config ID ( new Field) |
| Wager Denom | Denomination of the unit of wagering |
| Game Desc | Sub - Game Description (i.e. DBL DBL, Deuces Wild, Red Wht Blue) |
| Paytable ID | Paytable ID |
| Addl ID | Additional Paytable ID, if available for specified model |
| Coin In | (Starting Coin In - Ending Coin In) |
| HP Out | Total Coin Out - Coin Out |
| Coin Out | Total Coin Out - Handpay Out |
| Theo Hold % | Theo Hold Percentage |
| Game Hold % | (DPC Win/DPC Handle)*100 |

Where DPC Handle = (Starting Coin In - Ending Coin In)

and DPC Win = DPC Handle - (Starting Coin Out - Ending Coin Out)

FIG.23B

METHOD AND DEVICE FOR COLLECTING AND REPORTING DATA

CROSS-REFERENCE TO RELATED APPLICATIONS

This application claims priority from US provisional application 60/409,779, filed on Sep. 10, 2002, the contents of which are expressly incorporated herein by reference.

TECHNICAL FIELD

This disclosure relates to data collection and reporting, and, more specifically, relates to collecting data from gaming devices having multiple games and capable of having multiple denominations of wagers, as well as reporting the collected data.

BACKGROUND OF THE INVENTION

Networked slot machines capture large amounts of data, such as amount of money deposited into the machine (coin-in), amount paid by the machine (coin-out), amount of jackpots, and bonuses, etc. While older slot machines were single purpose, i.e., they were limited to a single type of game, newer slot machines are capable of playing different types of games, even within the same cabinets. For example, the same game cabinet can hold a slot, poker, and a keno game. Additionally, some of these newer games also have more than one betting denomination, i.e., minimum price per play. The denomination could be set by the casino, for instance to offer discounts at slower play times, or could be set by the player, if, for instance, different denominations had different pay tables. These type of machines are sometimes referred to as MGMD (Multi-Game; Multi-denomination) devices.

Each possible combination of denomination, game type, and game pay schedule may result in a unique theoretical hold percentage. Each combination may also have differing levels of player acceptance.

To determine player acceptance and other information, a casino operator must be able to collect data from the slot machines and perform queries on the data. Present game accounting systems are unable to account for MGMD devices.

Embodiments of the invention address these and other deficiencies in the prior art.

SUMMARY OF THE INVENTION

In one aspect, the invention features an accounting system. The accounting system comprises a receiver for collecting first meter information from a first unique combination of a game and a denomination in a single game unit, and for collecting second meter information from a second unique combination of a game and a denomination in the single game unit. The accounting system further comprises a database for storing the collected information.

In another aspect, the invention features a method of accounting for networked gaming devices. The method comprises accepting values from more than one unique combination of a game and a game denomination from a single game unit and storing the accepted values. The method further comprises accepting queries to the accepted values to extract a subset of the stored values.

BRIEF DESCRIPTION OF THE DRAWINGS

The description may be best understood by reading the disclosure with reference to the accompanying drawings.

FIGS. 3-18 are example screen views illustrating example screens that can be used to configure the accounting system according to embodiments of the invention.

FIGS. 19A, 19B, 20A, 20B, 21A, 21B, 22A, 22B, 23A, and 23B are example reports that can be produced by embodiments of the invention.

DETAILED DESCRIPTION OF THE PREFERRED EMBODIMENTS

Embodiments of the invention are directed to a slot machine data collection and reporting system capable of operating with multi-denomination, multi-game machines. These machines allow the patron to select the denomination of the wager unit, the game type, and the exact game pay schedule to be played. For example, the patron could configure the machine to have a base wager unit of a quarter, to play a five-card draw poker game, and to have a specific pay schedule that pays special bonus pays on certain four-of-a-kind hands.

Each possible combination of denomination, game type, and game pay schedule may result in a unique theoretical hold percentage. Each combination may also have differing levels of player acceptance. For this reason, a system that allows for the computation and tracking of handle, game hold percentage, theoretical hold percentage, and net win for each of the possible combinations within a single slot machine cabinet is very useful.

The system can provide the following information in reports on a weekly, month-to-date, and year-to-date basis for each game, schedule, and denomination on a multi-denominational and multi-game machine: slot handle, slot win, individual game hold percentage, machine hold percentage, and actual game hold and machine hold percentage. Of course, with the data collected by the system, other reports are available as well.

The system can be used as a data analysis and management tool, but typically would not be used to report or auditing taxable revenue, although it would be possible to do so. As such, the system can be used in conjunction with and augments existing Slot Accounting systems. All existing Slot Accounting related functionality is maintained.

Figure 1:
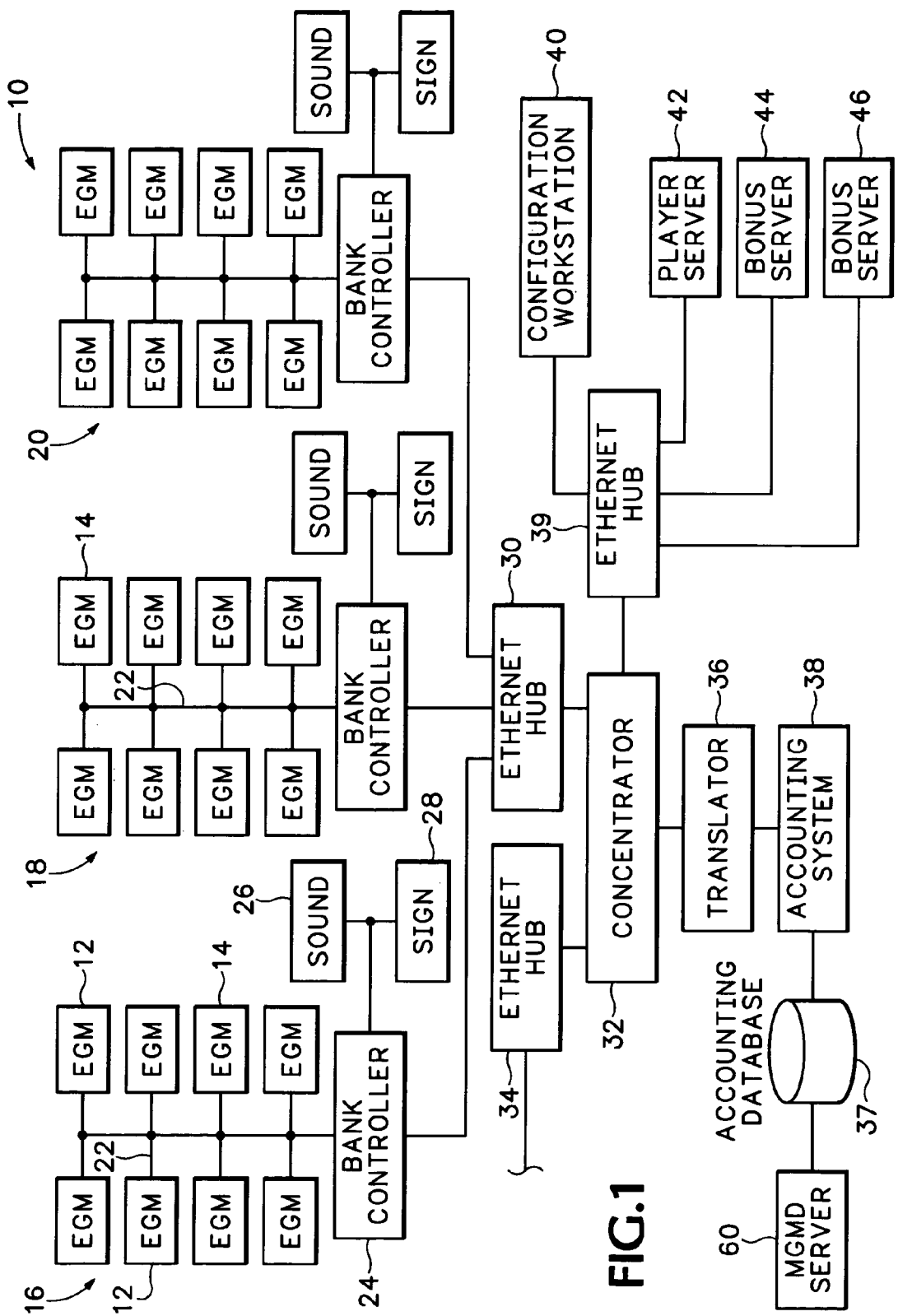
FIG. 1 is a functional block diagram of a gaming network on which the data collection system operates.

The system can operate on game network hardware, for instance a game network as described with reference to FIG. 1, which is an example of a modern gaming network. FIG. 1 is identical to FIG. 1 of U.S. Pat. No. B1 6,245,483, assigned to the assignee of the present invention, the teachings of which are incorporated herein in their entirety. In FIG. 1, indicated generally at 10 is a block diagram illustrating electronic gaming machines (EGMs), like EGMs 12, 14, which are interconnected by a computer network. Shown in the gaming network 10 are three banks of EGMs, indicated generally at 16, 18, and 20. Each separate EGM is connected via a network connection, like connection 22, to a bank controller 24. In embodiments of the invention, each bank controller 24 includes a processor that facilitates data communication between the EGMs in its associated bank and the other components on the network. The bank controller 24 also includes audio capabilities, like a CD or DVD ROM drive coupled to an audio board or sound card for transmitting digitized sound effects, such as music and the like, to a speaker 26 responsive to commands issued over the network 10 to bank controller.

The bank controller 24 is also connected to an electronic sign or screen 28 that displays information, such as scrolling, flashing, or other types of messages that indicate jackpot amounts and the like, which are visible to players of machines on bank 16. These message displays 28 are generated and changed responsive to commands issued over the network 10 to the bank controller 24. Each of the other banks 18, 20 of EGMs include associated bank controllers, speakers, and signs as shown, which operate in substantially the same manner. Additionally, sound and visual displays can be mounted directly on one or more of the EGMs 12, 14 directly.

A network connector, such as an Ethernet hub 30 connects the bank controllers 24 associated with banks 16, 18, 20 of EGMs to a concentrator 32. Another Ethernet hub 34 connects similar bank controllers (not shown), each associated with an additional bank of EGMs (also not shown), to the concentrator 32. The concentrator 32 functions as a data control switch to route data from each of the banks to a translator 36. The translator 36 includes a compatibility buffer between the concentrator 32 and an accounting system 38. The translator 36 functions to place all the data gathered from each of the bank controllers into a format compatible with an accounting system 38, which is coupled to an accounting database 37. The accounting system 38 could be implemented by a microcomputer including a microprocessor and operating system, such as an Intel Pentium microprocessor running one of the Microsoft Windows systems. Events that occur on each of the EGMs are monitored by the EGM and some events and totals may be stored in meters on the EGMs. Portions of the system communicate with an interface to the EGMs to retrieve data from the EGM and temporarily store it on the accounting system 38. Once on the accounting system, the data can be tabulated, queried, totaled, modified, formatted, and presented as described herein.

Another Ethernet hub 39 is connected to a configuration workstation 40, a player server 42, and to bonus servers 44, 46. Hub 39 facilitates data flow to or from workstation 40 and servers 42, 44, 46.

The configuration workstation 40 has a user interface that allows portions of the network 10 and the servers 42, 44, 46 to be set up and modified. The configuration workstation 40 could include a personal computer having a keyboard, monitor, microprocessor, memory, an operating system, and a network card coupled to the Ethernet hub 39.

The player server 42 includes a microcomputer that is used to track data of players using the EGMs. Another function of the player server 42 is to control messages that appear on displays associated with each EGM. The player server 42 may be embodied in a microcomputer including, for instance an Intel Pentium Processor, Microsoft operating system and a network card to couple the server to the Ethernet hub 39.

Bonus servers 44, 46 each are embodied by a microcomputer and are used to control bonus applications or bonus systems on the gaming network 10. Each bonus system includes a set of rules for awarding jackpots in excess of those established by the winning pay tables of each EGM. Some bonus awards may be made randomly, while others may be made to link to groups of EGMs operating in a progressive jackpot mode. Examples of such bonuses and networks used to implement them include those as described in U.S. Pat. Nos. 6,319,125 and 5,655,961, both of which are assigned to the assignee of the present invention, and the teachings of both of which are incorporated herein in their entirety for all purposes.

In some embodiments of the invention, due to a desire to minimize any changes in game-to-system protocols, IGT's SAS protocols can be used.

DEFINITIONS

For clarity, common terms in this description will be defined according to the definitions below:

"Game" refers to the particular game type and model, for example:
Standard Draw Poker
Double-Double Bonus Poker
Deuces Wild Poker
Reel-em-In Video Slot
Austin Powers™ Video Slot "Program" refers to the award schedule/game outcome probabilities that define a particular version of a model that yields a specified payback. Generally, game manufacturers assign unique numbers to each "program". This is a player selectable element in a machine allowing the player to changes the schedule or model for payout. This will be referred to as Schedule.

"Denomination" refers to the unit of wagering. In this context, denomination is not the denomination of the coin in the hopper or coin comparator.

"Slot handle" refers to the total dollars wagered on a specific denomination/game/program combination (DPC). This will be referred to as DPC Handle.

"Slot win" is the total dollars "held" or won by a specific DPC. This will be referred to as DPC Win.

"Individual game hold percentage" is the manufacturer specified theoretical hold percentage for that DPC. This will be referred to as DPC theoretical hold.

"Machine hold percentage" is the computed theoretical hold percentage for the cabinet taken as a whole, given an actual distribution of play across all DPCs in the cabinet. This is computed by taking the handle-weighted average of the theoretical holds of all DPCs. This will be referred to as Cabinet Theoretical Hold Percentage.

"Actual game hold percentage" refers to the observed hold percentage for a specific DPC. Because players can insert coins or bills while in one DPC and then change to other DPCs, the term "actual" must be carefully defined. Typically, actual refers to a game performance statistic based on an actual count of bills, coins, and jackpot/fill slips. Since players are free to select DPCs after a bill is inserted, there is no way to know which bill or coin is associated with each DPC. Therefore, the traditional meaning of actual does not apply here. For the sake of clarity the term actual will be eliminated and "game hold percentage" will be defined as:

((total dollars wagered in a DPC−total of all dollars paid out in all forms by a DPC))/(total dollars wagered in a DPC)

Since actual values don't apply, metered amounts will be used for all values in the above expression. This will be referred to as DPC hold percentage.

"Machine Hold Percentage" refers to the observed hold percentage of the entire cabinet. It is defined as:

(total dollars wagered in a cabinet−total of all dollars paid out in all forms by a cabinet)/(total dollars wagered in all DPCs of the cabinet)

To keep this definition analogous to the definition of game hold percentage, metered amounts will be used in all values in the above expression. This will be referred to as the Cabinet Hold Percentage.

Embodiments of the invention are capable of computing the following information:
DPC Handle
DPC Win
DPC Hold DPC Theoretical Hold
Cabinet Theoretical Hold
Cabinet Hold
and others.

Figure 2:
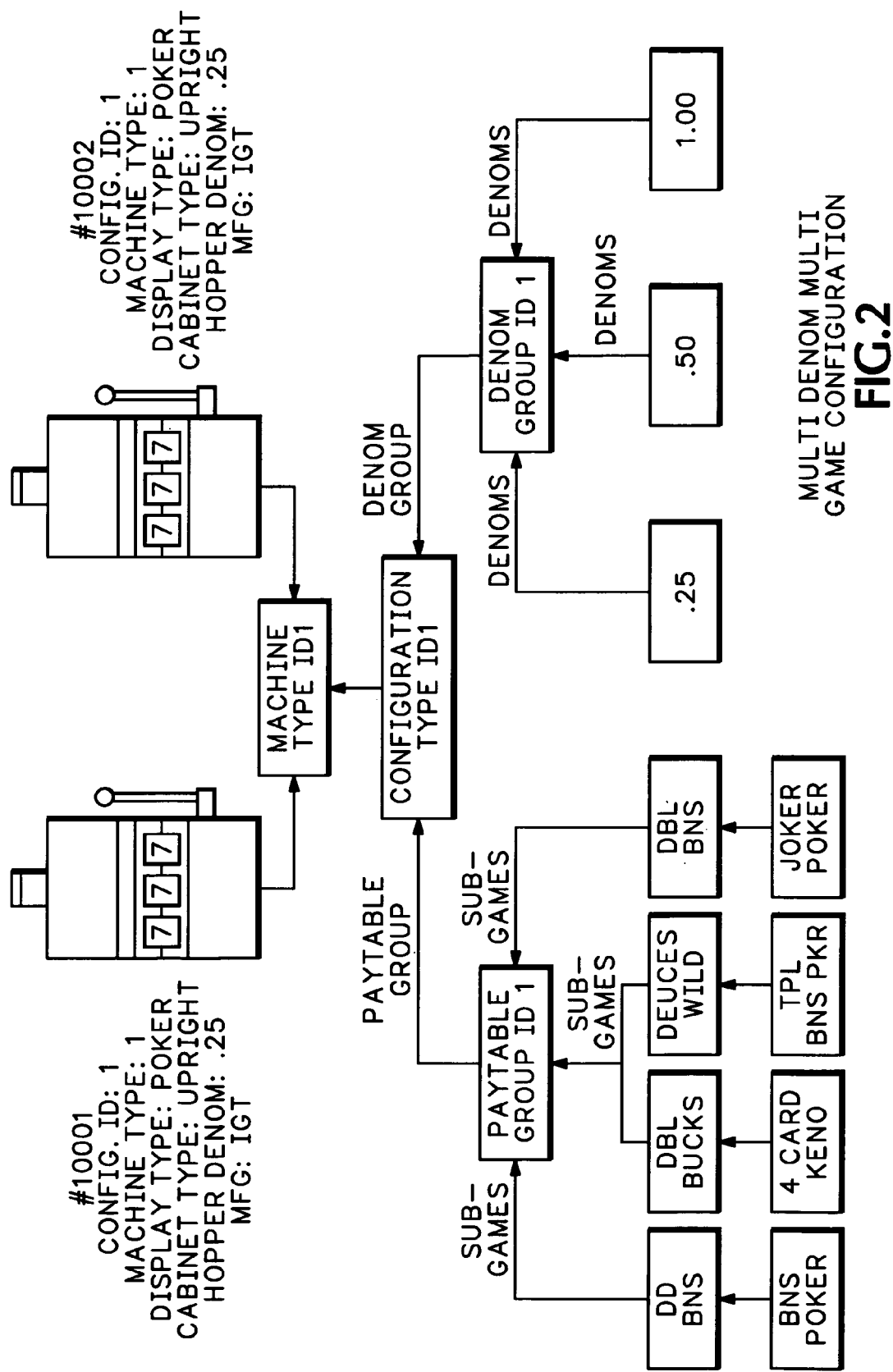
FIG. 2 is a functional block diagram of the organization of a data collection system according embodiments of the invention.

FIG. 2 illustrates a sample configuration how MGMD accounting information is organized. In FIG. 2, two machines of identical type, ID1, are illustrated. The machines have the reference numbers 10001 and 10002, respectively. The machine type ID1 is further configured with configuration ID 1, loosely broken into two sections, the denomination section and a paytable section. The denomination section has a group identification of ID1, which, as illustrated in FIG. 2 includes three denominations, $0.25, $0.50, and $1.00. Instructions of how to create and modify denomination groups are given below. The paytable section is also set up as ID1, to which several games are ascribed. Each separate combination of game, denomination, and paytable is referred to as a unique DPC.

With reference back to FIG. 1, an MGMD server 60 runs an MGMD accounting application that connects to the accounting database 37. Of course, as used herein, the accounting database is used generally and refers to any data that is possible to be stored in a casino environment. Additionally, the accounting system 38 and the accounting database 37 may in fact be spread across multiple physical computers, servers, and data storage devices.

Machine Configuration, Enrollment, and Changes

The specific machine pay table information may not be available to the system automatically until a game session. As a result of this, machine DPCs can be setup manually by the analyst using an external application. The MGMD application captures all additions, deletions and changes to the DPCs and transfers this to the accounting database 37. The DPC information stored in the database should be of sufficient detail to allow the operator to assign and enter the corresponding theoretical hold percentage obtained from game manufacturer literature. The tracking of this information in the database should include start dates, end dates and change dates for the configuration. It is possible for the casino to not setup the machine information manually and simply wait for game play to occur for each of the pay tables. If possible, the application based configuration information should contain:

For each DPC:
Schedule number (in sufficient detail to allow the operator to determine a theoretical hold percentage from the game manufacturer support documentation)
Denomination
Maximum Bet
Progressive levels
For each Cabinet
EPROM or Program ID version (associated with pay table)

From the perspective of the interface to the EGM 12, 14, a serial machine interface board, or SMIB, an example of which is a Bonus Engine 2 (BE2) sold by Acres Gaming of Las Vegas, Nev., and from the perspective of ABS (Acres' Bonusing System, also available from Acres Gaming), this is at least one sub-game on an EGM. It is possible for more that one game to be the same program ID, but from a data-gathering perspective, this is one game.

One program ID could be associated with different types of games. A Keno pay table may cover several different versions of Keno but the games will all be Keno. There would not be any video reels or poker games on that program ID. However, that same game can be configured to have different hold percentages at different denominations and therefore have different program ID identifiers for different denominations.

Part of the data that the BE2 can collect and send up to the accounting database 37 for each program ID can include fields that identify the game, paytable, and an additional id. These three fields can be concatenated together to generate a game identification number, which can be further related to a name that the slot manager can easily recognize.

Figure 3:
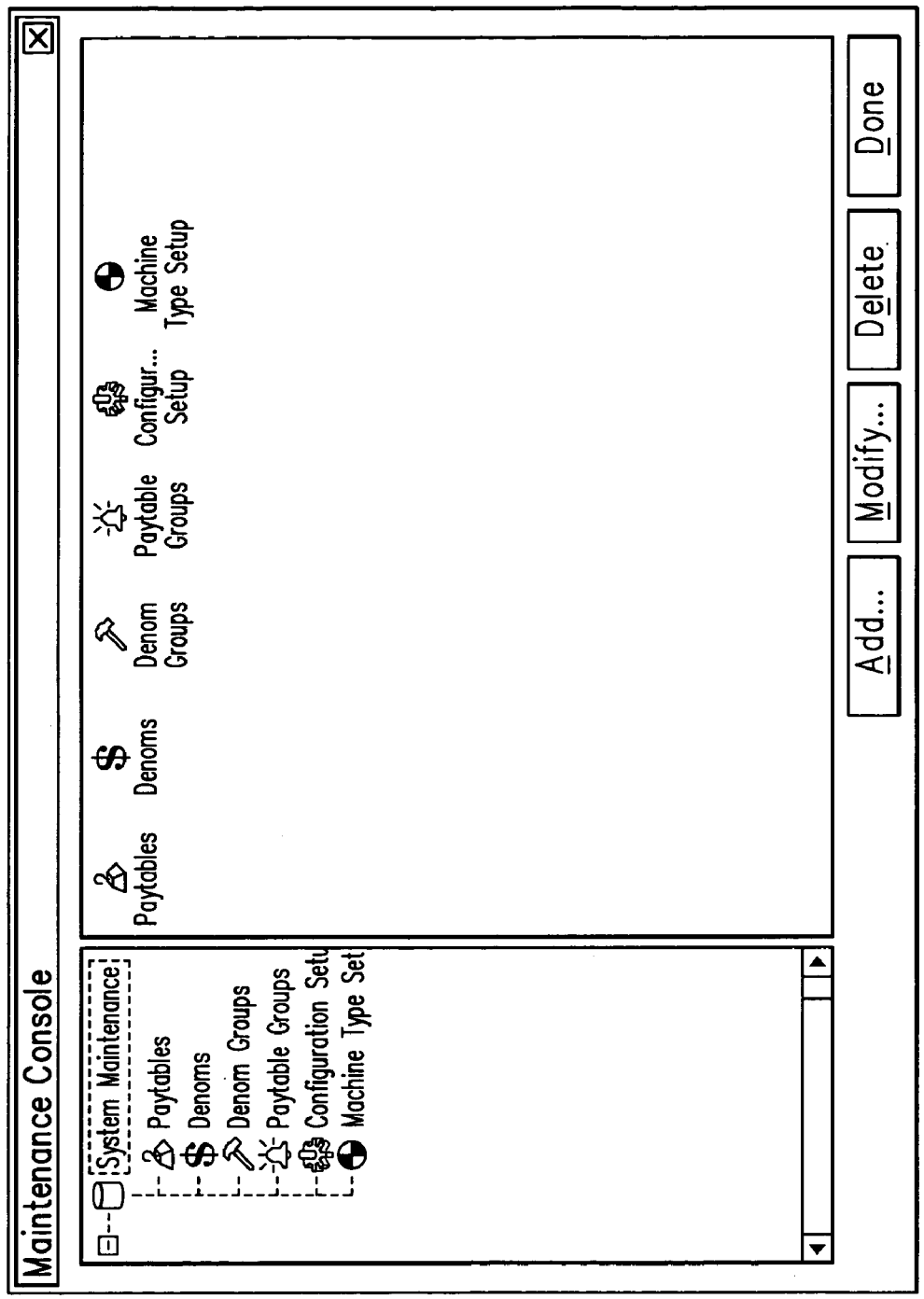

With reference to FIG. 3, illustrated is a software setup screen for the MGMD accounting application according to an embodiment of the invention. Through this console screen, modifications to paytables, paytable groups, denominations, denomination groups, configurations and machine setup can be accomplished, as described below.

Paytables and Paytable Groups

An EGM sends game and sub-game descriptions to the accounting system 38, where they can be obtained and used by the MGMD server 60. The game and sub-game description indicates the game type and pay table (glass). The addition of a numeric code, such as 4/5/6 means it pays 4 for straight, 5 for flush, and 6 for full house.

Figure 5:
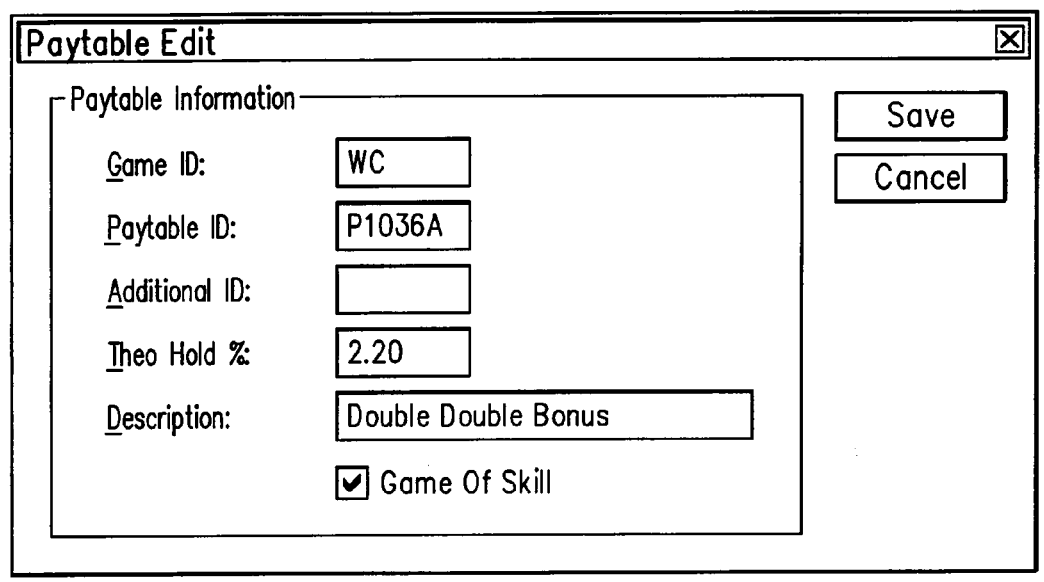

As shown in FIG. 4, various paytables that have been set up are illustrated. An example paytable entry could be double double bonus 4/5/6 (BSN DD 4/5/6), associated with a particular ID and additional ID. Paytables can be added, deleted, and modified using a screen such as that illustrated on FIG. 5, running on the application.

Some game operators adjust payout values from particular types of games, such as poker. Embodiments of the invention can accommodate these variations by adding the desired adjustment value to the Coin-in*Theoretical percentage. This calculation could be made part of the paytable setup, where a user can indicate an additional percentage to be added, for instance. Also, the Cabinet hold could be output to the screen for the user.

A typical paytable ID is six digits length. Any digits in a paytable ID above six can be used to indicate an "additional" ID. Thus, a paytable ID 003455 has a paytable ID and no additional ID, a paytable ID 0234556 has a paytable ID of 023455 and an additional ID of 6, and a paytable ID 123455456 has a paytable ID of 123455 and an additional ID of 456.

Figure 6:
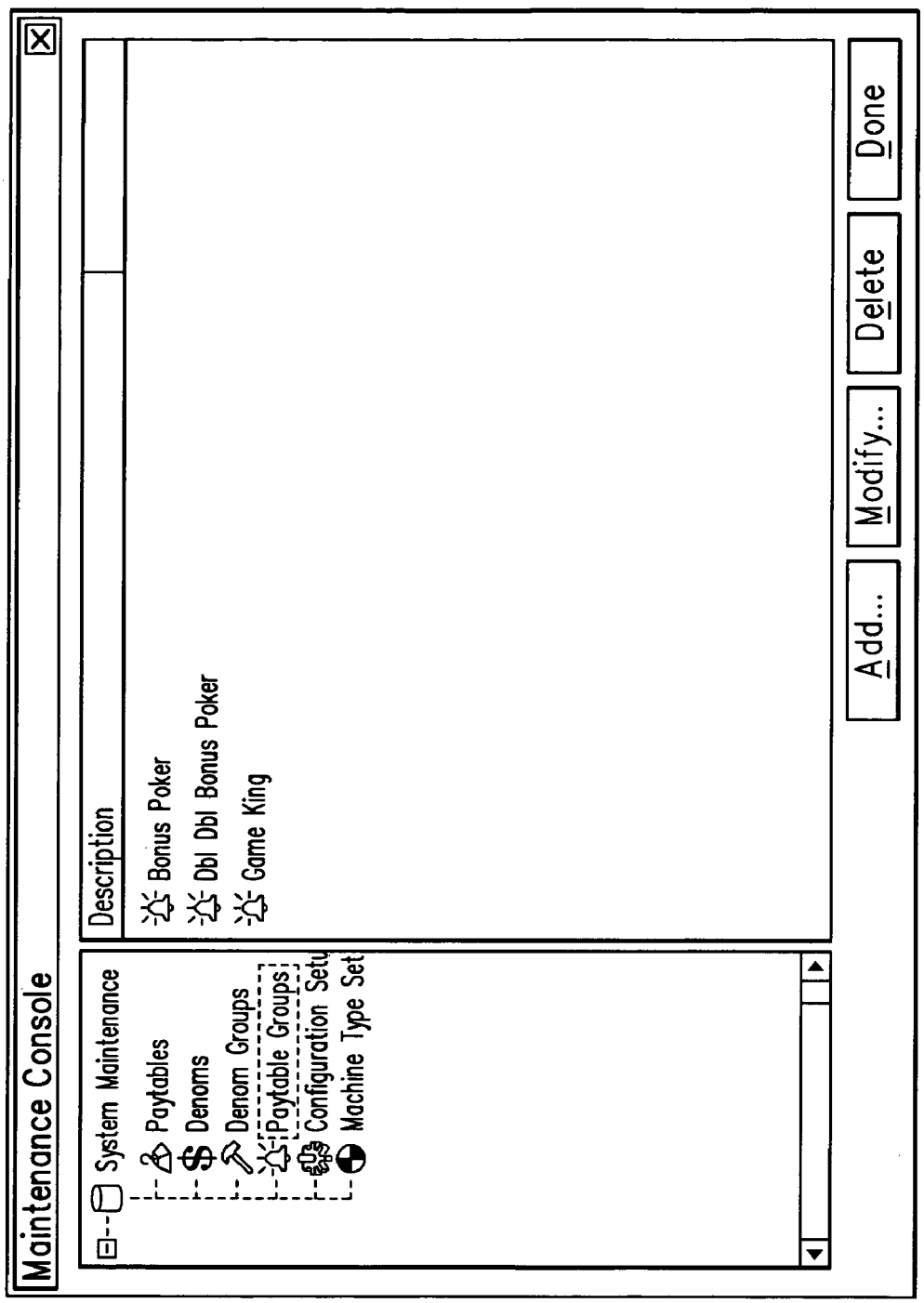
Figure 7:
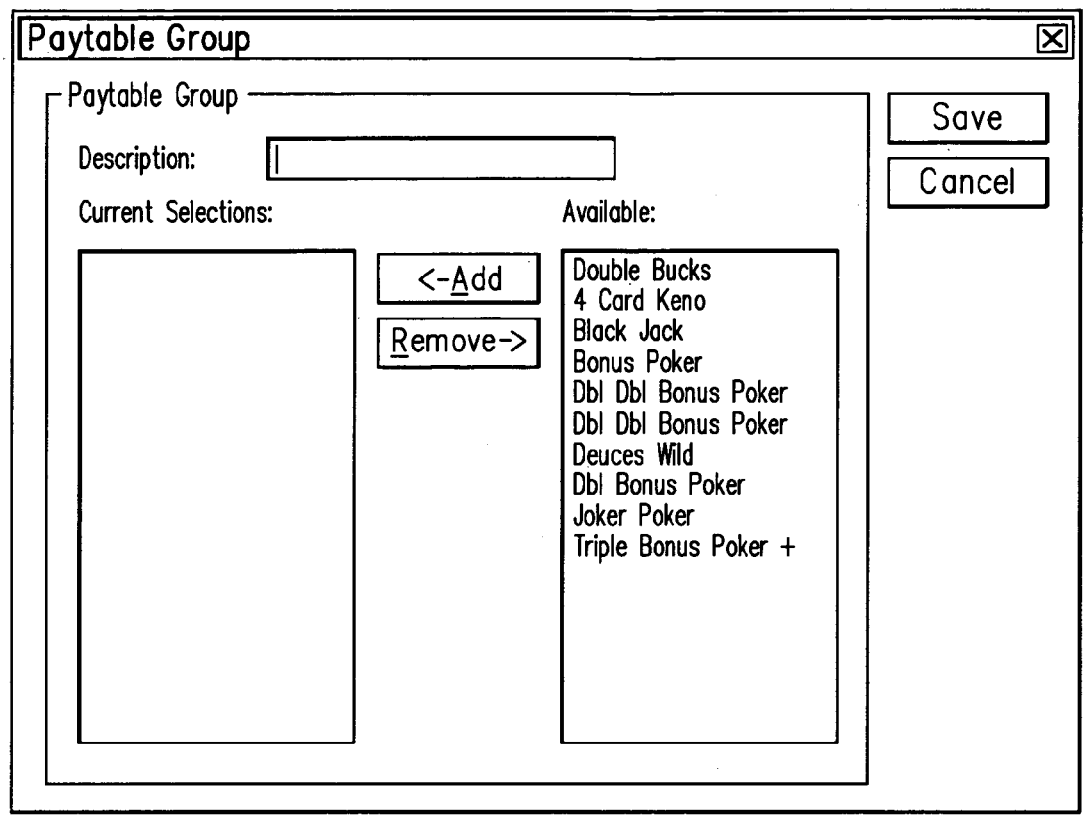

Once setup, paytables can be grouped according to how they are seen in the game. Example groups are illustrated in FIG. 6, which can be added, deleted, and modified by the screen illustrated in FIG. 7. Once grouped, the paytables can be applied to a configuration, which is then tied to a machine type, as illustrated in FIG. 2.

Paytables are populated by meter values from the EGM 12, 14 (FIG. 1). More specifically, the BE2 mounted within an EGM 12, 14, communicates with game electronics within the EGM 12, 14. When each paytable on the game is played, the BE2 sends the game session meters to the MGMD system. The meters are stored, and any paytable information is written to files. Paytable information can be setup before hand manually by users, as well as through the user application.

Denominations and Denomination Groups

Figure 8:
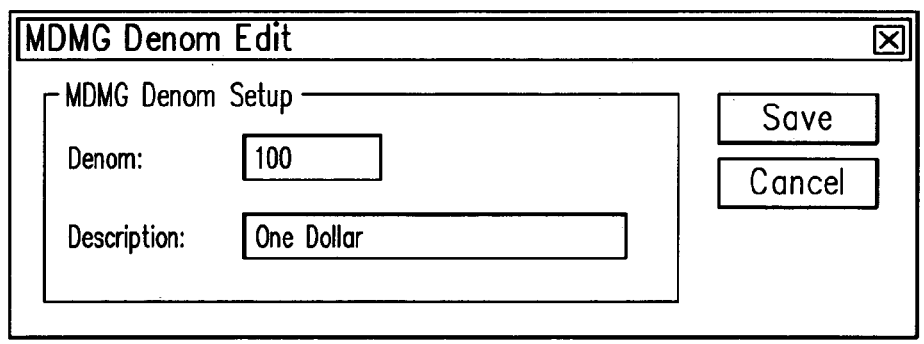
Figure 10:
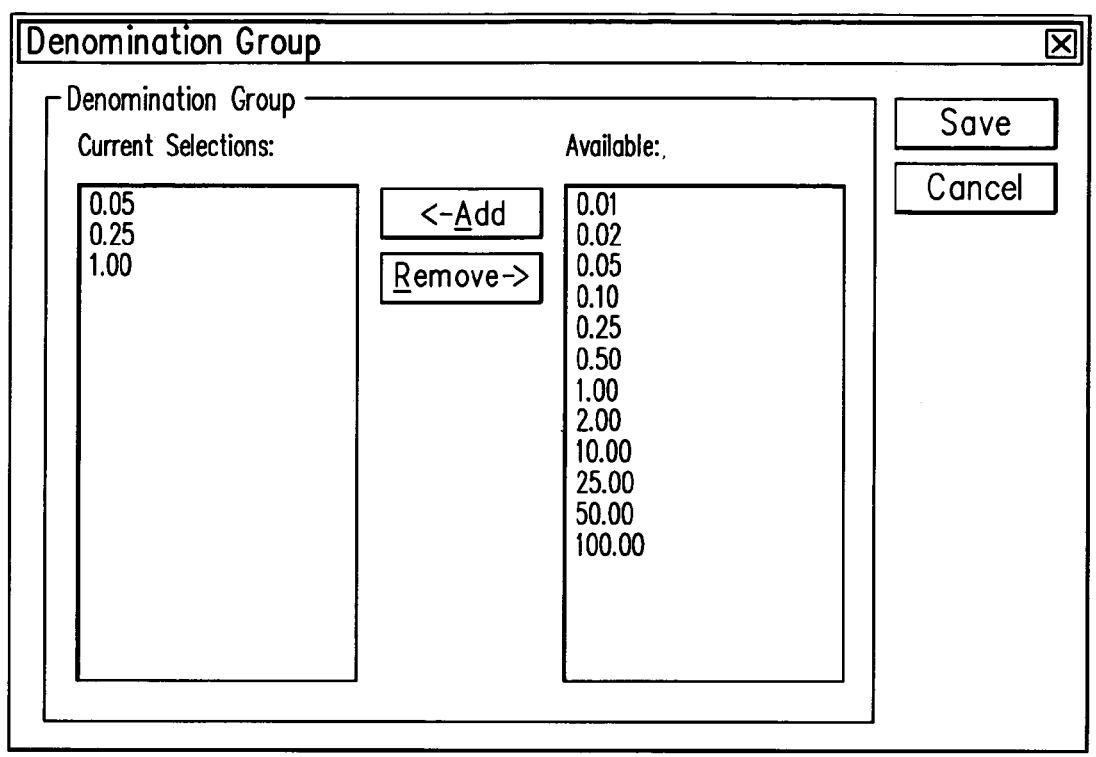
Figure 11:
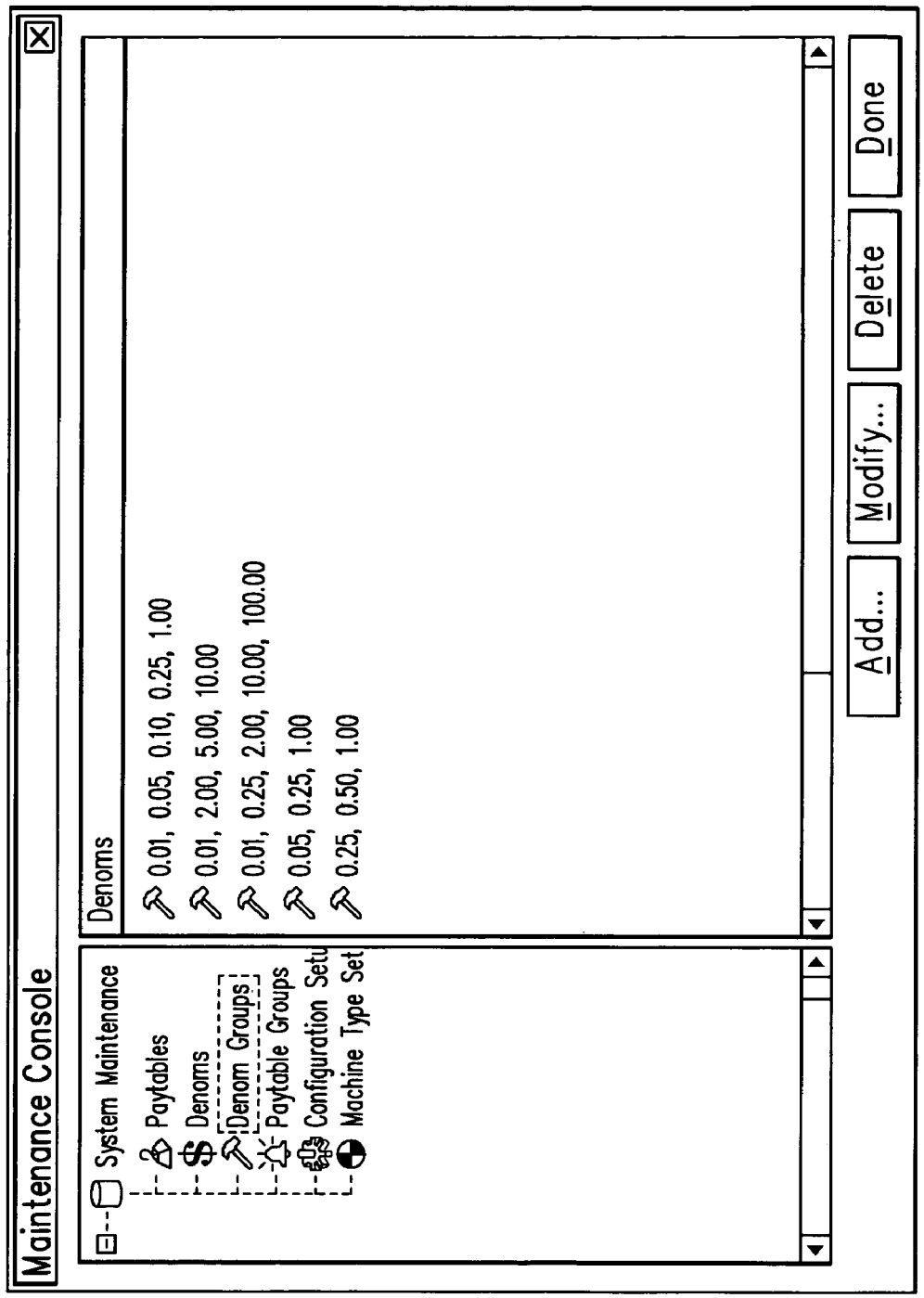

Denominations can be added/deleted/modified by using a screen such as that shown in FIG. 8. Once configured, the different denominations are shown on the denomination screen as shown in FIG. 9. Denominations can also be grouped, by using a screen such as that shown in FIG. 10. Once grouped, the denomination groupings appear in the main screen, as illustrated in FIG. 11. An example denomination grouping is also illustrated in FIG. 2.

Other Configurations

Once the paytables, denominations, and their associated groups are defined, a configuration identification group is defined, for instance by using the screen as illustrated in FIG.

12. For example, a casino analyst may want to review data based on various cabinet configurations. As an illustration, an analyst may want to compare Game Kings that run Configuration 1 to Game Kings that run Configuration 2, where the configurations are as illustrated in Table 1, below:

TABLE 1

| Configuration | Platform | Sub-Game desk. | Display type | Denom |
|---|---|---|---|---|
| 1 | Game King | DD Bonus 4/5/6 | Poker | .25/.50/1.00 |
|  |  | Dbl Bonus | Poker |  |
|  |  | Deuces Wild | Poker |  |
| 2 | Game King | DD Bonus 4/5/6 | Poker | .25/.50/1.00 |
|  |  | Dbl Bonus | Poker |  |

Figure 12:
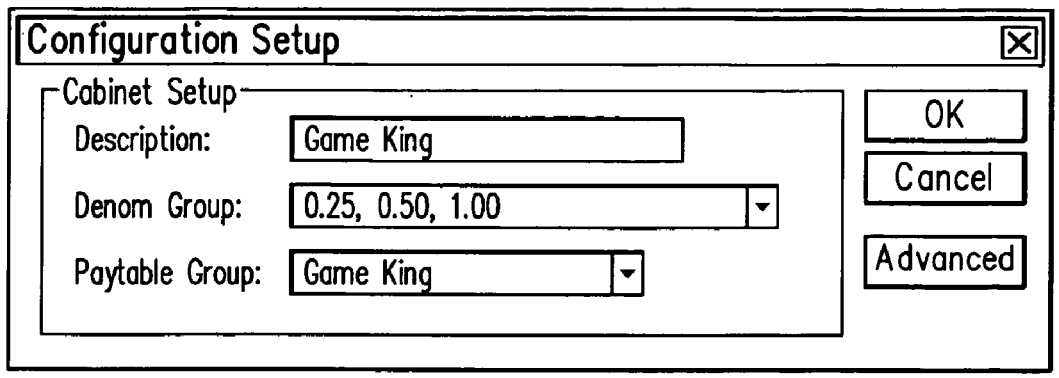
Figure 13:
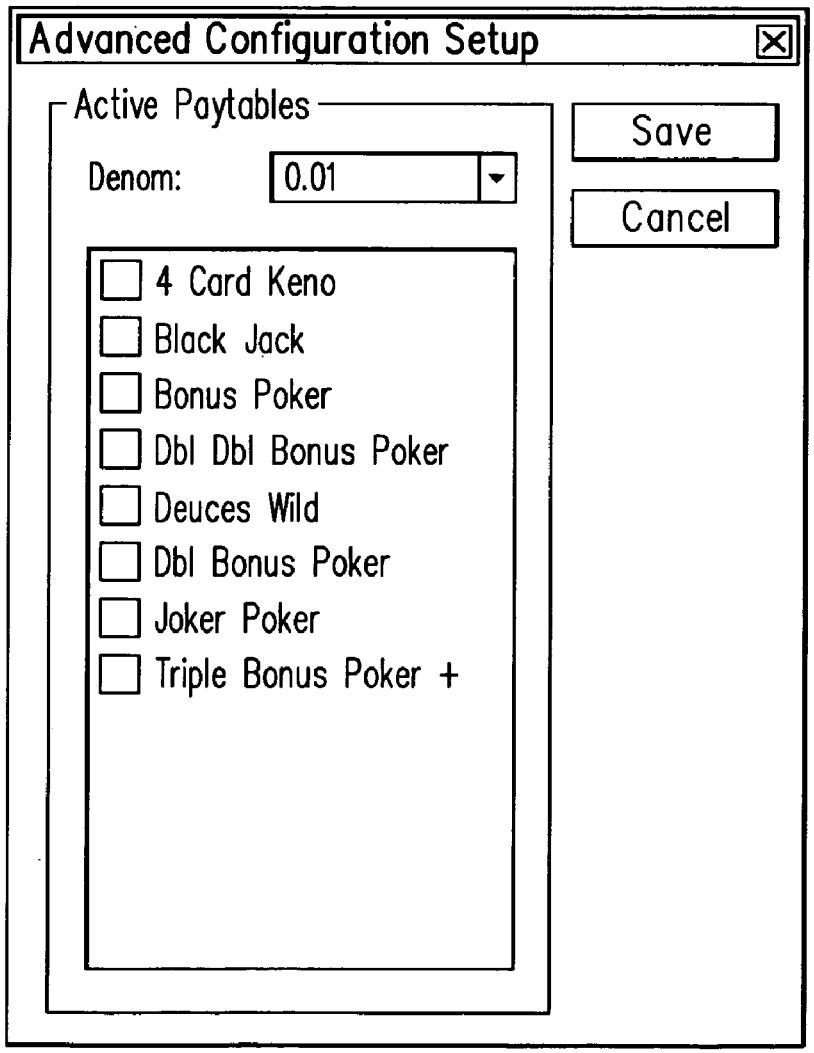

Because some configurations can have denominations that are only available to specific sub-games on a machine, an "Advanced" button on the screen illustrated in FIG. 12 is provided. Clicking such a button brings up an advanced screen, such as that illustrated in FIG. 13.

Figure 14:
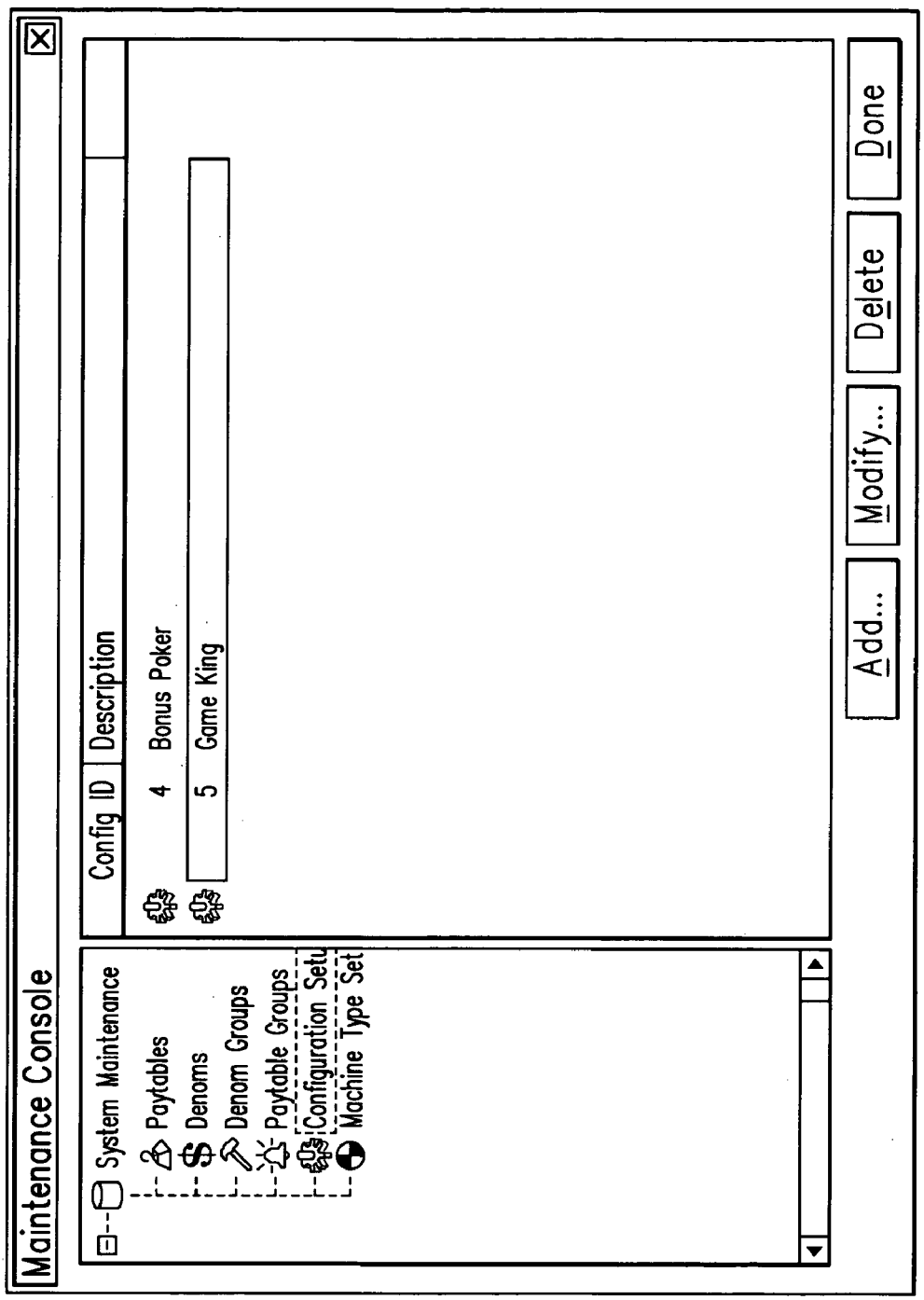

Once setup, the configurations appear such as in the example screen illustrated in FIG. 14.

Figure 15:
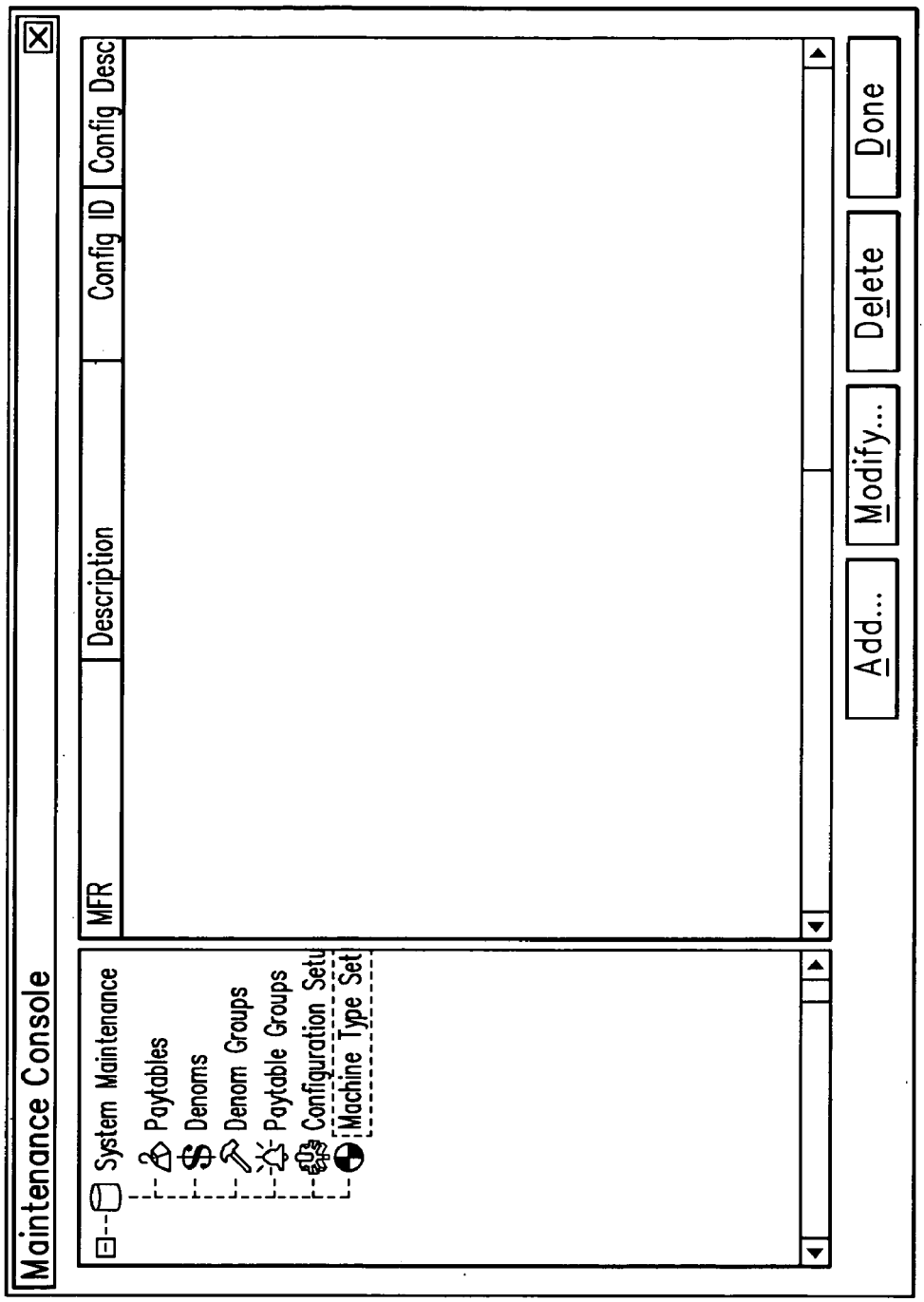
Figure 17:
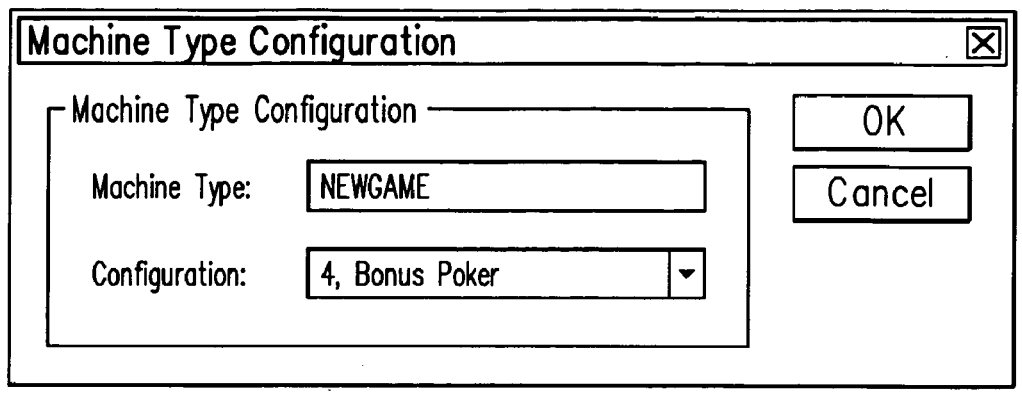

Also as illustrated in FIG. 2, once paytables and denominations are setup, they are grouped according to how they are seen in a game. This can be accomplished through a system maintenance paytable and denomination grouping. Once paytables and denominations are grouped, they can be applied to a configuration, as described above. The configuration is then tied to a machine type, by navigating through the screens illustrated as FIGS. 15, 16, and 17

Running the Accounting Application

Once properly set up, accounting data is gathered from the EGMs 12, 14 (FIG. 1), and populates the accounting database 37. The collection and transmission of data does not impact system performance in other areas. System response to jackpots, fills, bonus pays, player card inserts, and electronic funds transfers, etc. are not adversely affected by the addition of messaging required to support multi-denomination/multi-game reporting.

In some embodiments, the meter collection takes place on a daily basis. Meters that have changed are collected at rollover (a predetermined time set in the system such as every 15 or 30 minutes) and at DG change, such as when a player completes a particular gaming session, and changes the denomination or game he or she is playing (denom or game change after the session is complete). Processing time and network traffic is assessed. To ensure performance standards, in some embodiments of the invention, only the meter or meters that have changed, rather than the entire meter packet, is collected. Also, in some embodiments of the invention, only a subset of all the available meters is sent to the accounting system 38. Additionally, rollover meters are within acceptable accuracy levels for EOD (end of day), because these meters are within a 7-15 minute window of the EOD. All changes in meters for a game session in progress prior to EOD are be reported for the next business day if the session ends within this 7-15 minute window of the EOD.

Figure 18:
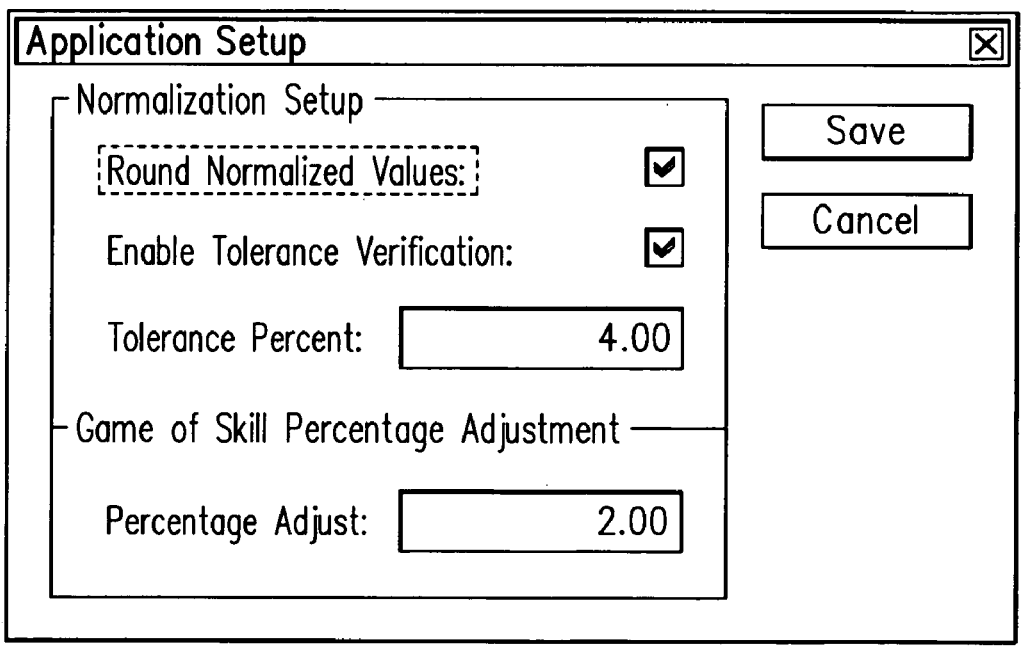

The issue of blown meters can be handled by several different methods. Generally, the sub-game meters must equal the cabinet meters. In some embodiments, sub-game meters within +/−4% of the total game meters are accepted. This number can be adjusted, for example, by using an interface screen such as that illustrated in FIG. 18. If sub-game meters are found to be out of variance, a three-day average is used to fix meters. It is acceptable to use only audited meters for reports. If the Coin In, Coin Out, or any of the jackpot and bonus related meters are modified during the accounting audit, these audited meters should be reflected back to the Multi-denom multi-game meter table. At the cabinet level, when the system user reviews reports that come out of the Multi Denom Multi Game module, (described below) they trace back to the Coin In, Coin Out and JP Payouts on the Meter Slot Win reports.

Specific Meters

Information can be derived from the following meters:
  Coin In: Total pennies wagered in a DPC.
  Total Coin Out: Total pennies paid as a result of a winning outcome generated by the DPC. It would include pennies paid on progressive jackpots, since these are machine determined. It would not include pennies paid as the result of system bonus payments such as XTRA CREDIT, or Lucky Coin awards.

Based on these definitions, the desired machine performance metrics can be computed over a specific time period as follows:

$$\text{DPC handle} = \Delta \text{Coin In} \tag{1}$$

where: $\Delta$Coin In=Ending Coin In Meter−Starting Coin In Meter $$\text{DPC Win} = \text{DPC handle} - \Delta \text{Coin Out} \tag{2}$$

where: $\Delta$Coin Out=Ending Coin Out Meter−Starting Coin Out Meter $$\text{DPC Hold Percentage} = \text{DPC Win} / \text{DPC Handle} * 100 \tag{3}$$

$$\text{Cabinet Hold Percentage} = \Sigma \text{DPC Win} / \text{DPC Handle} * 100 \tag{4}$$

where: $\Sigma$DPC Win=Sum of win from all DPCs in a cabinet $\Sigma$DPC Handle=Sum of handle from all DPCs in a cabinet $$\text{Cabinet Theoretical Hold Percentage} = 100 * \Sigma(\text{DPC Handle/Cabinet Handle} * \text{DPC Theoretical Hold}) \tag{5}$$

where: $\Sigma$ is the summation over all DPCs in a cabinet
Cabinet Handle=total handle for the cabinet Since, during the audit process, it may be advantageous to know how much of total coin out was paid in hand pays versus machine pays, in some embodiments of the invention the Total Coin Meter is split into two constituent parts. This may also allow compliance with soon to be released slot accounting standards. These two parts are:

Coin Out: Total pennies paid directly by the machine as the result of a winning outcome generated by a DPC. This would include pennies paid directly by the machine in the form of credits to the credit meter, coins from the hopper, an electronic funds transfer, or a ticket out. This would not include payments made at the machine by an attendant. This would not include system generated bonus payments such as LUCKY COIN jackpots or XTRA CREDIT.
  Hand Pay Out: Total pennies paid as a result of a winning outcome generated by a DPC that were paid by an attendant in the form of a hand pay. This does not include system generated bonus payments paid by hand such as lucky coin jackpots.

Given these definitions Total Coin Out can be expressed as:

Total Coin Out=Coin Out+Hand Pay Out

Coin Out Includes, for example: Game Win from the credit meter; Cancel Credits, Bonus Pays, XTRA CREDIT, low level Progressives, Mysteries and Lucky Coin.

Handpay Out Includes, for example: Handpays, High Level Progressives; Jackpots where the game was actually locked up with a JP signal.

Meters Summarized

The following meters are collected currently by the gaming system and stored on the accounting server 38 (FIG. 1) in the Accounting database 37 in a meter table. The collection of the meters can be associated back to a unique identifier, which most likely will be the combination of Game ID, Wager Denomination, and Pay Table ID in play at the time the meters moved.

MtrTrueCoinIn—Value of physical tokens inserted;
MtrTrueCoinOut—Value of physical tokens paid out by the game;
MtrCoinIn—Value of wagers;
MtrCoinOut—Value of winnings delivered by the game;
MtrGames—Number of game cycles played;
MtrJP—Value of winnings delivered by attendant by a Handpay;
MtrCreditPay—Value of winnings that were first paid to a game credit meter but later delivered to the player by a Handpay caused when the player attempted to cash out;
MtrProg—Value of winnings from participation in a Linked Progressive;
MtrMatchBonus—Value of bonus awards delivered as a match of a play wager (such as XTRA CREDIT);
MtrCOdBonus—Value of deductible bonus awards paid;
MtrCOndBonus—Value of nondeductible bonus awards paid.

Bonusing Considerations

The definitions and calculations given above include bonusing payments. This ensures that the effects of bonusing do not taint the analysis of DPC performance. This allows DPC hold to be compared to theoretical DPC hold, prior to consideration of bonus payments.

To evaluate the impact of bonusing two additional bonusing meters are used.

Deductible Bonus Paid Meter—Increments once for every penny paid as a bonus that is considered to be deductible from machine win in the calculation of taxable machine revenue.

Non-Deductible Bonus Paid Meter—Increments once for every penny paid as a bonus that is not considered to be deductible from machine win in the calculation of taxable machine revenue Provided sufficient bandwidth is available, these meters should also be maintained for each DPC.

Data Collection Frequency

Meter data should be gathered upon game play and at time rollover, such as every 15 or 30 minutes, for example. In some embodiments of the invention, for end of day, if meters are collected within 15 minutes of the hour, the statistical impact is felt to be minimal at this time and deemed acceptable. At time rollover the player's current session may be sent. It is understood that a player's session may span more than one business day. Meters for the player's session is recorded as close to the day they occurred as possible resulting in the most minimal statistical impact.

Data sets from each machine should preferably be gathered at the same time. In other words, it is not preferred to gather meters from one DPC during one hour, then from another DPC another hour later, etc. Meters from all DPCs within a cabinet should be gathered at the same time. If possible, rollover DPC meters should be gathered in a manner that allows them to be time coincident with the existing meter set used for Slot Accounting. This allows for comparisons between systems.

Slot Accounting Database Modifications

The Slot Accounting database 37 (FIG. 1) accommodates the new tracking fields and calculation results described in the above sections. Data would be written at least once a day to the database and summarized by MTD, YTD and LTD. As stated above, the machine may be considered the "master" storage area for the DPC configurations.

Data Storage

Below is a summary of data that can be collected from the EGMs, through the BE2s, or computed from data collected from the EGMs, and stored either on the accounting server 38 (FIG. 1), the accounting database 37, or elsewhere in the game network:

Actual Hold Per Game
Cabinet Handle
Cabinet Hold
Cabinet Theo Hold
Deductible Bonus Paid Meter
Denom(Wager)
DPC handle
DPC Hold
DPC Theo Hold
DPC win
EPROM
Game ID
GameType
Maximum Bet
Meter Hand pay Out (defined as winning outcome generated by the DPC and paid by attendant)
Metered Coin In
Metered Coin Out (defined as winning outcome generated by the DPC and paid by machine)
Metered Days
Non-Deductible Bonus Paid Meter
Pay Table ID and Additional Pay Table ID, if needed
Progressive Levels
Schedule Number
Total Coin Meter (meter coin out+meter hand pay out)
Hold values are typically expressed as percentages.

It terms of program, or EPROM number, i.e. the specific version of EPROM(s) in the slot machine, the casino customer should be capable of setting up a unique machine type based solely on a difference in EPROM number.

For example, if the location wants to track an IGT S+ Double Diamonds with main game EPROM Version 1.0, separately from an IGT S+ Double Diamonds with main game EPROM Version 2.0, then they can do that by setting up a unique machine type for each of these configurations in their database.

Presumably, these types would also be used in the database. It would also be advantageous for the machine to report the EPROM number(s) to the database, which can be done using modern communication protocols.

Schedule refers to any unique model/schedule configuration, which the player can select. This could be as simple as changing from 5/8 Draw Poker to a 7/10 Double Double Poker. A player could also change from 5/8 Poker to Wild Rhino video slot; this would be a change of model and pay schedule, and would result in a separate DPC.

Implementation Considerations

A DG change event is when the player selects "a new game" or "new denomination for a given game" and the game is played. When this happens the BE2 within the EGM can send the meter data (either only the meters that have changed, or only a subset of the available meters in the EGM, or a combination of the two) to the accounting system 38, and by extension, to the MGMD server 60.

Additionally, this data is sent by the BE2 to the accounting system 38 on a timed rollover event, which happens every 30 minutes or so. Embodiments of the invention allow the user to determine the amount of time between timed rollover events.

Near the end of the day, the translator 36 (FIG. 1) generates an End of Day Broadcast. This should give all the BE2s within the EGMs 12, 14 on the floor enough time to respond to the host before the end of day. An end of day event can be treated like a timed rollover event, and the BE2 can send meter data to the accounting system 38.

In addition, the ABS system can take an end of day "snapshot" of the DG table records in the DB. Then, daily delta values can be derived from this daily snapshot.

Reporting:

The Slot Accounting application system running on the MGMD server 60 has flexibility in its reporting. The number of possible reports is nearly endless, and will grow as the user realizes the potential of the system. A user interface can assist the user in maintaining: sub-game descriptions, game types, configurations and reporting.

Example reports that can be generated by embodiments of the invention are illustrated in FIGS. 19A-23B. Illustrated in FIGS. 19A and 19B is an example report for an MGMD slot master, which The MGMD Slot Master report describes the games by game type. Games with a specific configuration can be examined within a particular type, such as "poker."

Illustrated in FIGS. 20A and 20B is an example report for an MGMD model analysis report, which describes the games by configuration ID. This allows an analyst to review how different games compare within the specific configurations. For example, an analyst can compare how machines configured as configuration ID 1 are performing relative to configuration ID 2.

Illustrated in FIGS. 21A and 21B is an example report for an MGMD machine analysis report, which describes the games by asset number and location. This allows an analyst to review how different a single game is performing on a daily basis. For example, an analyst can compare how machine 20003 is performing as compared to machine 20004.

Illustrated in FIGS. 22A and 22B is an example report for an MGMD machine analysis report, which describes games by wager denomination. This allows an analyst to review how different single wagering denominations are performing on a daily basis. For instance, an analyst can compare how $0.25 slots are performing compared to $5.00 slots.

Illustrated in FIGS. 23A and 23B is an example report for an MGMD machine analysis report, which describes games within a cabinet. This allows an analyst to review how different games are performing within a single cabinet. For instance, an analyst can compare how a $0.25 denomination is performing to $1.00 denomination within a single cabinet.

Although examples of machines and processes have been described herein, nothing prevents embodiments of this invention from working with other types of machines and processes. Implementation of the data gathering and reporting system is straightforward in light of the above description. As always, implementation details are left to the system designer. The specific circuits and procedures used to account for the data collection and where to store the collected data may be implemented in any way, with any components, although preferred components have been listed herein. Although functions are performed in a system including a gaming device and a central accounting system, many of the functions can be performed on either the gaming device, or the controller, or some functions performed on both the gaming device and the controller, depending on how the system is implemented. Inclusion of description or illustration of a function in either the gaming device or the central controller is not dispositive that the function is located in or must be performed there.

Thus, although particular embodiments for a multi-game multi-denomination accounting system have been discussed, it is not intended that such specific references be considered as limitations upon the scope of this invention.

What is claimed is:

1. An accounting system, comprising:
a receiver configured to collect from a single game unit first meter information from a first unique combination of a game, a program and a denomination in the single game unit and second meter information from a second unique combination of a game, a program and a denomination in the single game unit, wherein a program represents a pay schedule that includes game outcome probabilities that define a particular version of a model that yields a specified payback, and wherein each of the game, the program, and the denomination is separately selectable;
a database configured to store the collected information; and
a calculator structured to generate additional information from the collected information for the unique combinations in the single game unit, including at least:
a first comparison of financial performance of different wager denominations for a given game at the game unit, the first comparison displayed in a first table that includes information about each of the different wager denominations for the given game at the game unit, and
a second comparison of financial performance of different games within a given game type at the game unit, the second comparison displayed in a second table that includes financial performance information about each of the different games within the given game type at the game unit.

2. The accounting system of claim 1 wherein the first meter information is coin-in for the first unique combination.

3. The accounting system of claim 2, wherein the receiver is structured to also collect coin-out information for the first unique combination.

4. The accounting system of claim 3 wherein the coin-out information does not include system bonus payments.

5. The accounting system of claim 3 wherein the coin-out information includes monetary value paid directly by the single game unit and monetary value generated by the single game unit for the first unique combination but paid in the form of a hand pay.

6. The accounting system of claim 1 wherein the first meter information and second meter information are subsets of all meters stored in the single game unit.

7. The accounting system of claim 1 wherein the first meter information and the second meter information are only collected if the first meter information and the second meter information are non-zero information.

8. The accounting system of claim 1 wherein the first meter information and the second meter information are collected at a regular interval.

9. The accounting system of claim 1 wherein the calculator is structured to generate a hold percentage for the first unique combination during a certain time period.

10. The accounting system of claim 1, further comprising:
a reporter structured to gather and present portions of the collected information.

11. The accounting system of claim 1, further comprising:
a reporter structured to gather and present portions of the collected information and the additional information.

12. The accounting system of claim 1 wherein the additional information includes slot handle, slot win, individual game hold percentage, machine hold percentage and game hold percentage.

13. A method of accounting for networked gaming devices, comprising:
collecting values from more than one unique combination of a game, a program and a game denomination from a single game unit, wherein a program represents a pay schedule that includes game outcome probabilities that define a particular version of a model that yields a specified payback, and wherein each of the game, the program, and the denomination is separately selectable;
storing the collected values;
accepting, by a computer system, queries to the collected values and generating, by the computer system, calculated values from the collected values for all unique combinations in the single game unit, including at least:
a first comparison of financial performance of different wager denominations for a given game at the game unit, the first comparison displayed in a first table that includes information about each of the different wager denominations for the given game at the game unit, and
a second comparison of financial performance of different games within a given game type at the game unit, the second comparison displayed in a second table that includes financial performance information about each of the different games within the given game type at the game unit; and
reporting the calculated values.

14. The method of claim 13 wherein reporting the calculated values comprises printing the calculated values.

15. The method of claim 13 wherein each unique combination has a unique identifier.

16. The method of claim 15 wherein the single game unit has an identifier unique from any other game unit in the network of gaming devices.

17. The method of claim 13 wherein collecting values comprises collecting meter values.

18. The method of claim 17 wherein collecting meter values comprises collecting meter values only if they are non-zero values.

19. The method of claim 18 wherein collecting meter values comprises collecting fewer than all of the available meter values in the single game unit.

20. The method of claim 17 wherein collecting meter values comprises collecting meter values after an event.

21. The method of claim 20 wherein the event is the end of a session of the game and game denomination.

22. The method of claim 13 wherein collecting values comprises collecting values at established time intervals.

23. The method of claim 22 wherein an established time interval is once per day.

24. An accounting system, comprising:
a receiver configured to collect from a single game unit first meter information from a first unique combination of a game, a program and a denomination in the single game unit and second meter information from a second unique combination of a game, a program and a denomination in the single game unit, wherein a program represents a pay schedule that includes game outcome probabilities that define a particular version of a model that yields a specified payback, and wherein each of the game, the program, and the denomination is separately selectable;
a database configured to store the collected information;
a calculator structured to generate additional information from the collected information for the unique combinations in the single game unit, including at least:
a first comparison of financial performance of different wager denominations for a given game at the game unit, the first comparison displayed in a first table that includes information about each of the different wager denominations for the given game at the game unit, and
a second comparison of financial performance of different games within a given game type at the game unit, the second comparison displayed in a second table that includes financial performance information about each of the different games within the given game type at the game unit; and
wherein the first meter information and the second meter information are collected at established intervals.

* * * * *